Feb. 3, 1948.   N. L. COOPERIDER   2,435,201
WET CLEANOUT SYSTEM FOR FILTERS
Filed March 24, 1945
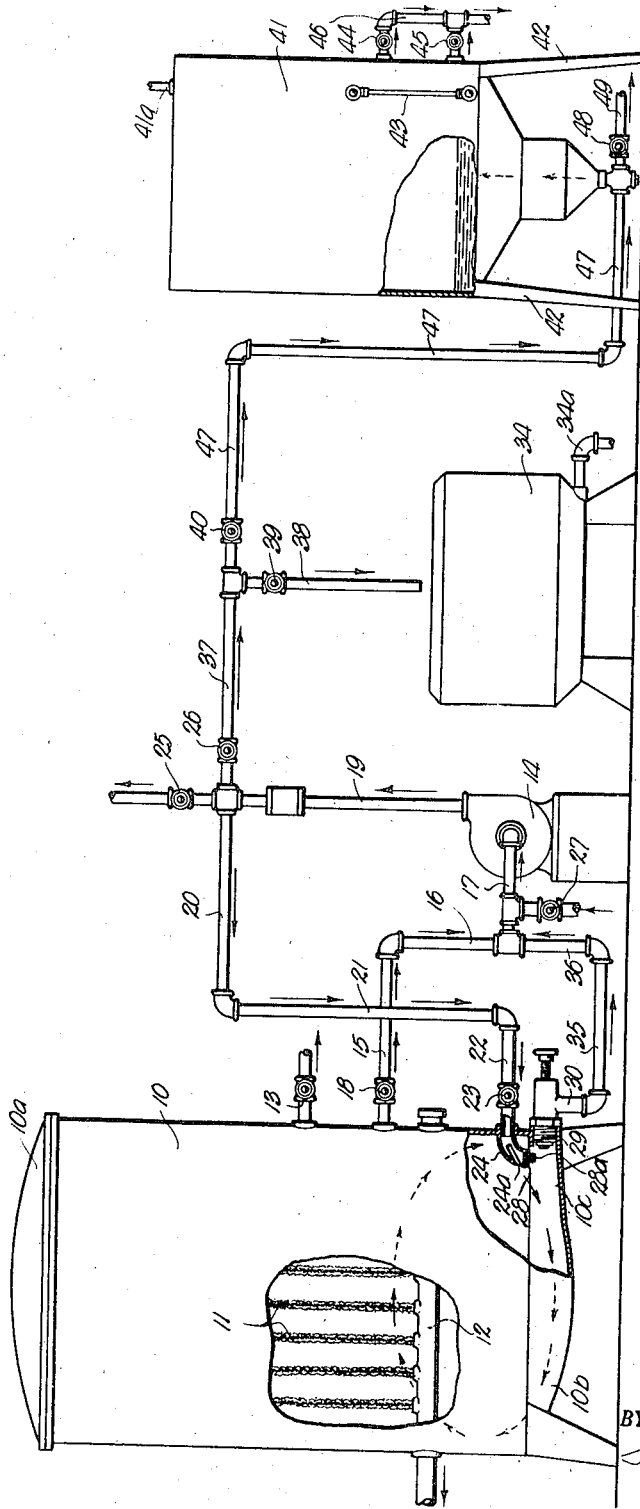
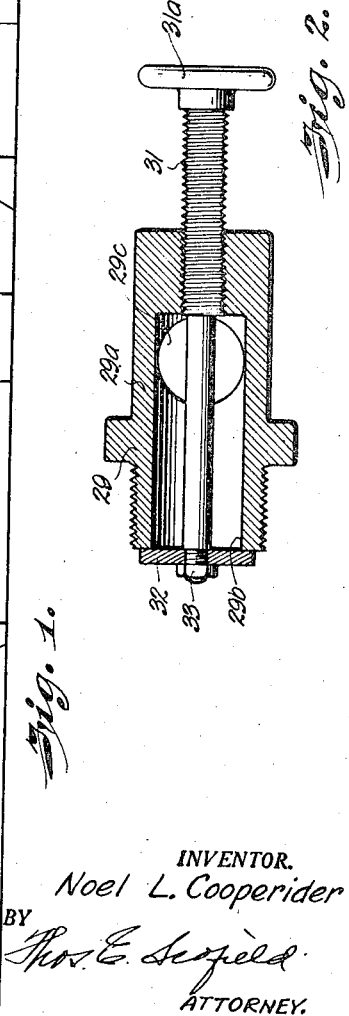
INVENTOR.
Noel L. Cooperider
BY
Thos. E. Scofield
ATTORNEY.

Patented Feb. 3, 1948

2,435,201

UNITED STATES PATENT OFFICE 2,435,201

WET CLEANOUT SYSTEM FOR FILTERS

Noel L. Cooperider, Kansas City, Mo., assignor to Butler Manufacturing Company, Kansas City, Mo., a corporation of Missouri Application March 24, 1945, Serial No. 584,524

4 Claims. (Cl. 210—177)

1

This invention relates to improvements in wet cleanout systems for filters and refers more particularly to a cleanout system for muck which accumulates in the bottom of filters used in the clarification of dry cleaners solvent.

Heretofore accumulated muck has been manually shoveled or raked from the filter bottom through doors or handholes formed therein. This method of removing the muck is both laborious and dirty or messy and as a result many operators do not clean out their filters often enough to obtain the best results from the filters. This invention is an improvement over the patented wet cleanout system disclosed in Patent 1,895,083. The patented system has not been entirely satisfactory because the bottom suction line from the filter tends to clog or plug up solid with filter muck or mud rendering the system inoperable. Also in the patented method the muck is removed from the filter suspended in a substantial amount of solvent which is disposed of resulting in an appreciable solvent loss.

An important object of this invention is to provide a filter flushing or wet cleanout system for filters.

Another object is to provide a filter flushing system in which there is less likelihood of clogging than in wet cleanout systems used heretofore.

A further object is to provide a filter flushing system in which the solvent loss is negligible.

Other and further objects will appear from the following description.

In the accompanying drawings which form a part of the instant specification and are to be read in conjunction therewith and in which like reference numerals are used to indicate like parts in the various views, Fig. 1 is a side elevational view of the wet cleanout system with parts broken away, and Fig. 2 is an enlarged sectional detail of the valve disposed in the discharge or outlet opening of the filter.

Referring to the drawings the filter 10 has a removable top 10a and is equipped with vertical standpipes located within the filter but not shown in the drawing, through which contaminated solvent is introduced thereto. A plurality of filter screens 11 within the filter are connected to a manifold 12. The contaminated solvent passes through the screens 11 and is withdrawn in a purified condition through manifold 12. The substances removed and contaminated filter powder collects on screens 11 and when

2 it is periodically dislodged in cleaning the screens, it accumulates in the bottom 10b of the filter. Periodically filter 10 is cut out of the dry cleaning system so that the muck may be removed. About midway of the height of the filter is a valved drain pipe 13 to which level the solvent is drained when the filter has been cut out of the dry cleaning system. After adjusting the solvent level a cyclic circulation of the solvent within the filter is created to agitate the accumulated muck. To obtain this circulation pump 14 withdraws solvent from the filter through pipes 15, 16 and 17 and discharges the solvent into the bottom portion 10b of the filter through pipe connections 19, 20, 21 and 22 and jet 24. Valve 18 in pipe 15 and valve 23 in pipe 22 controls the circulation of the solvent through these connections. During this solvent circulation valves 25 and 27 in the lines connecting pump 14 to the cleaning system line and valve 26 in the line leading to the extractors are closed.

Jet 24 is located within filter 10 adjacent its bottom and comprises an elbow having a slot 24a cut in its convex curvature and a plug 28 screwed into its open end with a hole 28a bored through the plug. The apertured plug 28 is hereinafter more fully explained. The jet is adjusted to spray a fan-shaped stream of solvent from slot 24a substantially parallel to the filter bottom to agitate the accumulated muck and to create a circulation of solvent and suspended muck within the lower portion of the filter as indicated by the arrows.

A radial drainage channel 10c welded into the bilged filter bottom is located beneath the jet 24. Valve 29 is threadedly connected in the end of channel 10c and serves as a discharge outlet for the muck solvent suspensoid. A hole 28a in plug 28 directs a stream of solvent into that portion of drainage channel 10c directly in front of the discharge outlet and thereby clears accumulated muck from in front of the outlet or valve 29. Valve 29 detailed in Fig. 2 comprises an elongated body 29a having an inlet port 29b extending into the drainage channel, a discharge port 29c connected to pipe 30 and an intermediate passageway. A threaded valve stem 31 extends axially through the passageway and is screwed into a threaded aperture in body 29a. The valve stem has a handle 31a at one end and a valve disk or pusher plate 32 mounted by a nut 33 on the opposite end. This plate seats outwardly against the valve inlet port 29b. Obviously, when the valve is opened the pusher plate 32 shoves accumulated muck away from the valve inlet port. Thus, a positive action is provided to prevent clogging of the valve. It is important that the withdrawal valve for the muck in a wet cleanout system be within or immediately adjacent the filter to avoid the possibility of muck accumulation in the outlet pipe.

When the circulation of the solvent and muck has continued for a sufficient time to suspend all of the muck the circulation is discontinued by closing valves 18 and 23. At this juncture the suspended muck is transferred to the centrifugal extractor 34 through pipes 30, 35, 36 and 17 connected to the suction of pump 14 and pipes 19, 37 and 38 connected between the discharge of the pump and extractor 34. Discharge valve 29 and valve 26 in pipe 37 controlling the withdrawal pipes are opened. Valve 40 in the line leading to the extractor tank 41 is closed. Extractor 34 is a conventional extractor used in many cleaning establishments for extracting cleaning solvent from fabrics that have been dry cleaned. Before introducing the suspensoid to the extractor 34 a canvas bag or other strainer, not shown in the drawings, is placed in the extractor and serves to separate the muck from the solvent. The bag is preferably equipped with handles and after the muck has been separated from the solvent the bag containing the muck is removed and emptied. The clear solvent drains from the extractor 34 through drain 34a into a solvent dump tank not shown.

The muck tank extractor 41 is optional equipment for establishments equipped with centrifugal extractors of the type shown at 34 or is necessary equipment for separation of the muck from the solvent for an establishment not having a centrifugal extractor. Extractor tank 41 has an upper cylindrical portion and a tapered bottom and is supported on legs 42. The tank is equipped with a vent 41a and a liquid level gauge 43. Two solvent drainage connections 44 and 45 controlled by valves are connected to a common drawoff pipe 46. The lower tapered portion of the extractor is filled before the extraction operation with water which has a greater affinity for the muck than does the solvent. Conduit 47 controlled by valve 40 transfers the muck solvent mixture from pipe 37 to the extractor tank.

If extractor tank 41 is to be used the valves for removal of solvent and muck from the filter are adjusted the same as when the centrifugal extractor is used, except that valves 39 and 48 are now closed and valve 40 is opened. The suspensoid then passes into the bottom of the extractor tank 41 and up through the water in the bottom thereof. When the transfer of the suspensoid to the extractor is complete the contents of the extractor is allowed to settle for at least four hours during which time the muck and water settles in the lower portion of the extractor tank and the solvent rises. After separation the solvent is drawn off through connections 44 and 45 and then valve 48 is opened and the water and muck drain through pipe 49 into a sump or sewer not shown.

It is believed that the operation of the cleanout system is obvious from the foregoing description. It is contemplated, however, that this system may be employed to clean out filters other than those employed to clarify dry cleaner's solvent.

It will be seen that the objects of this invention have been accomplished. There has been provided a flushing assembly and method for easily performing the heretofore laborious job of cleaning a filter. The arrangement is such that the mess which usually results when a filter is cleaned out through a bottom door is completely eliminated and the loss of solvent in the cleanout operation is negligible. The construction is such that there is little likelihood of the assembly becoming clogged during use.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. A wet cleanout system for filters used in the clarification of dry cleaners solvent comprising a jet positioned within and adjacent the bottom of the filter for introducing a flushing liquid to agitate the accumulated muck, an outlet tube connected horizontally into the filter adjacent its bottom for withdrawing the suspended muck, a rotatable stem extending longitudinally of the tube, a pusher plate mounted on the stem covering the inner end of the tube and adapted to remove accumulated muck from said outlet opening with rotation of the stem.

2. A cleanout as in claim 1 wherein the jet for introducing the flushing liquid comprises a slotted opening adapted to throw a fan-shaped stream, said jet inclined downwardly to project the stream substantially parallel with the filter bottom and set up a cyclic circulation of the liquid and muck within the filter bottom and a supplemental jet opening for introducing a separate stream of flushing liquid in front of the outlet opening.

3. A cleanout as in claim 1 wherein the jet comprises a pipe elbow with a plugged end, a slot formed in the convex curvature of the elbow, said slot angled downwardly whereby the stream of flushing liquid projected therefrom sweeps the filter bottom.

4. A cleanout as in claim 1 wherein the jet comprises a pipe elbow with a plugged end, a slot formed in the convex curvature of the elbow, said slot angled downwardly whereby the stream of flushing liquid projected therefrom sweeps the filter bottom and an axial hole formed in the plug adapted to throw a separate stream of flushing liquid in front of the outlet opening.

NOEL L. COOPERIDER.

REFERENCES CITED

The following references are of record in the file of this patent:

UNITED STATES PATENTS

| Number | Name | Date |
|---|---|---|
| 521,040 | Oliver | June 5, 1894 |
| 1,751,613 | Baylis | Mar. 25, 1930 |
| 2,044,096 | Moran | June 16, 1936 |
| 1,895,083 | Norquist et al. | Jan. 24, 1933 |
| 1,545,091 | Flowers | July 7, 1925 |
| 1,263,226 | Genter | Apr. 16, 1918 |
| 1,385,724 | Smith et al. | July 26, 1921 |
| 2,013,370 | Tygart | Sept. 3, 1935 |
| 598,296 | Snyder et al. | Feb. 1, 1898 |
| 1,139,825 | Vandercook | May 18, 1915 |

FOREIGN PATENTS

| Number | Country | Date |
|---|---|---|
| 24,887 | Great Britain | 1895 |